(12) United States Patent
Jones et al.

(10) Patent No.: US 10,210,391 B1
(45) Date of Patent: Feb. 19, 2019

(54) METHOD AND SYSTEM FOR DETECTING ACTIONS IN VIDEOS USING CONTOUR SEQUENCES

(71) Applicant: Mitsubishi Electric Research Laboratories, Inc., Cambridge, MA (US)

(72) Inventors: Michael Jones, Belmont, MA (US); Tim Marks, Newton, MA (US); Kuldeep Kulkarni, Tempe, AZ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/670,021

(22) Filed: Aug. 7, 2017

(51) Int. Cl.
G06K 9/00 (2006.01)
G06T 7/246 (2017.01)
G06K 9/62 (2006.01)
G06N 3/04 (2006.01)

(52) U.S. Cl.
CPC ...... G06K 9/00711 (2013.01); G06K 9/00771 (2013.01); G06K 9/623 (2013.01); G06K 9/6229 (2013.01); G06N 3/0445 (2013.01); G06T 7/248 (2017.01); G06T 2207/20021 (2013.01)

(58) Field of Classification Search
USPC ........................................................ 382/103
See application file for complete search history.

(56) References Cited

U.S. PATENT DOCUMENTS 8,345,984 B2   1/2013  Ji et al.
2005/0157908 A1   7/2005  Matsugu et al.

FOREIGN PATENT DOCUMENTS

CN   103593661   9/2016

OTHER PUBLICATIONS

Karen Simonyan, Andrew Zisserman, "Two-Stream Convolutional Networks for Action Recognition in /ideos." (Submitted on Jun. 9, 2014 (vl), last revised Nov. 12, 2014 (this version, v2)), Computer Vision and Pattern.*
Singh et al., "A Multi-stream Bi-directional Recurrent Neural Network for Fine-Grained Action Detection." Computer /ision and Pattern Recognition (CVPR), 2016 IEEE Conference on, Jun. 27-30, 2016, Las Vegas, NV, USA, IEEE.*

(Continued)

*Primary Examiner* — Gregory F Cunningham
(74) *Attorney, Agent, or Firm* — Gene Vinokur; James McAleenan; Hironori Tsukamoto (57) ABSTRACT

A method and system for detecting actions of an object in a scene from a video of the scene. The video is a video sequence partitioned into chunks, and each chunk includes consecutive video frames. The method including the following elements. Acquiring the video of the scene, wherein the video includes a sequence of images. Tracking the object in the video, and for each object and each chunk of the video, further comprising: determining a sequence of contour images from video frames of the video sequence to represent motion data within a bounding box located around the object. Using the bounding box to produce cropped contour images and cropped images for one or more images in each chunk. Passing the cropped contour images and the cropped images to a recurrent neural network (RNN) that outputs a relative score for each action of interest.

20 Claims, 7 Drawing Sheets

(56) References Cited

OTHER PUBLICATIONS

Karen Simonyan, Andrew Zisserman, "Two-Stream Convolutional Networks for Action Recognition in Videos." (Submitted on Jun. 9, 2014 (v1), last revised Nov. 12, 2014 (this version, v2)), Computer Vision and Pattern Recognition (cs.CV), CoRR, vol. abs/1406.2199, http://arxiv.org/abs/1406.2199.

Singh et al., "A Multi-stream Bi-directional Recurrent Neural Network for Fine-Grained Action Detection." Computer Vision and Pattern Recognition (CVPR), 2016 IEEE Conference on, Jun. 27-30, 2016, Las Vegas, NV, USA, IEEE.

Singh bharat et al. "A Multi Stream Bi Directional Recurrent Neural Network for Fine Grained Action Detection," 2016 IEEE Conference on Computer Vision and Pattern Recognition (CVPR), Jun. 16, 2016. pp. 1961-1970. IEEE, :Los Alamitos, Ca, US.

Ming Yang et al., "Human Action Detection by Boosting Efficient Motion Features," 2009 IEEE 12th International Conference on Computer Vision Workshops, ICCV Workshops, Sep. 27, 2009, pp. 522-529. Institute of Electrical and Electronics Engineers, Piscataway, NJ.

\* cited by examiner

FIG. 3A  Input image

FIG. 3B  Contour image

METHOD AND SYSTEM FOR DETECTING ACTIONS IN VIDEOS USING CONTOUR SEQUENCES

FIELD

The present disclosure relates generally to computer vision and camera surveillance applications, and more particularly to detecting instances of objects, such as people, performing certain actions of interest in videos, by using a sequence of contour images computed from frames of a video sequence to represent motion information.

BACKGROUND

In computer vision and camera surveillance applications, a frequent problem is recognizing and detecting certain actions performed by objects such as people, machinery, vehicles, robots, etc. There has been a fair amount of work on the general problem of analyzing actions in videos, but most of the prior art work has focused on action recognition rather than on action detection.

Action recognition refers to classifying, i.e., recognizing, which action is being performed in a video segment that has been temporally trimmed so that the segment starts at or near the beginning of an action and ends at or near the end of the action. We use the term temporally trimmed to refer to such video segments. Action detection refers to a temporal or spatio-temporal localization of every occurrence of each action from a known set of action classes occurring in a long, i.e., not temporally trimmed, video sequence.

Related to action recognition is the task of activity recognition. In an activity recognition task, a video segment that depicts an activity, such as a particular sport being played, is analyzed, and the goal is to determine which activity (e.g., which sport) is depicted in the video.

Fine-grained action detection refers to action detection in which the differences among the classes of actions to be detected are small. For instance, in a cooking scenario, detecting actions from a set that includes similar actions such as chopping, grating, and peeling is an example of fine-grained action detection. However, at least one deficiency of prior-art methods for action detection is their relatively low accuracy. That is, the the performance of prior-art action detection methods are not good enough for most computer vision applications, among other applications.

The standard pipeline for most video analysis tasks such as action recognition, event detection, and video retrieval was to compute hand-crafted features, such as Histogram of Oriented Gradients (HOG), Motion Boundary Histogram (MBH), and Histogram of Optical Flow (HOF). Conventional approaches rely on computationally expensive input representations such as improved dense trajectories or dense optical flow, create a Fisher vector for each video clip, then perform classification using support vector machines. However, at least one main drawback of the above previous approaches to action detection/recognition, among many drawbacks, is that these approaches rely on input representations and intermediate representations that are very time-consuming to compute and require a huge amount of memory to store. This makes such conventional methods impractical for real-world action detection applications.

Therefore, there is a need for developing action detection methods that can detect actions in a video efficiently, both in terms of time and memory requirements.

SUMMARY

The present disclosure relates generally to computer vision and camera surveillance applications, and more particularly to detecting instances of objects, such as people, performing certain actions of interest in videos, by using a sequence of contour images computed from frames of a video sequence to represent motion information.

The present disclosure provides methods and systems that overcome the problem for video analysis tasks such as action recognition, event detection, and video retrieval that rely on input representations and intermediate representations that are very time-consuming to compute and also require a huge amount of memory to store. In particular, the present disclosure describes action detection methods and systems that are able to detect actions in a video efficiently, both in terms of minimizing time-consuming computations and reducing memory storage/requirements.

Specifically, the present disclosure is based on a recognition that the use of a sequence of contour images computed from frames of a video sequence to represent motion information, can provide for fast and memory efficient detectors for actions in videos, among other things. For example, the present disclosure addresses action detection in videos based on localizing in time (which frames of the video) and space (where in each frame) the occurrence of the particular actions. Through experimentation we realized we can detect actions in videos using a deep neural network with recurrent connections that takes as input a cropped image around a tracked object, such as a person, as well as a sequence of contour images that represent the motion within the cropped region across multiple frames. We found from previous approaches using optical flow-based representations that such approaches are costly to compute, i.e., require time-consuming computations and large amounts of memory and storage. This makes these previous action detection approaches impractical for real-world applications.

The present disclosure further includes an object/person tracker that can spatially localize where the action takes place within the video frames. We discovered through experimentation that conventional approaches that do not use a tracker, and instead only analyze motion and appearance over entire frames, use a large amount of information that is irrelevant to the action of interest. Also, such approaches do not have enough detailed information from the regions that are most important to the task.

Further, the present disclosure also uses a multi-stream recurrent neural network (RNN) that learns features that represent the important aspects of both the motion and appearance, and learns the important temporal dynamics over many video frames that distinguish different actions. For example, the methods and systems can be used for detecting actions of objects in a video, where the objects can be people, animals, machinery, vehicles, robots, industrial robots in a factory setting, etc. The present disclosure provides for a more accurate action detection for actions of objects that occur in videos that are not temporally trimmed.

Another aspect of the present disclosure includes use of a Long Short-Term Memory (LSTM) network, included as one or more layers of the RNN, which can learn patterns with longer temporal duration than can be learned using a conventional RNN. The present disclosure can provide better performance using a bi-directional LSTM, which means that the present disclosure can detect actions using information from past and future video frames.

To help further understand the present disclosure, we have provided steps of at least one method that includes detecting actions of an object in a scene from a video of the scene, wherein the video can be taken by a video device and the video itself can be a video sequence partitioned into chunks, such that each chunk can include consecutive video frames.

The method of the present disclosure, for example, can include the step of acquiring the video of the scene, wherein the video includes a sequence of images. It is possible the video could have been downloaded by a processor into memory, wherein the processor accesses the memory to acquire the video. The next step can include tracking the object in the video, and for each object and each chunk of the video, the method can further include the steps of: determining a sequence of contour images from video frames of the video sequence to represent motion data within a bounding box located around the object. The next step can be using the bounding box to produce cropped contour images and cropped images for one or more images in each chunk. Finally, the last step can be passing the cropped contour images and the cropped images to a recurrent neural network (RNN) that outputs a relative score for each action of interest.

It is contemplated that an output interface may be connected to the processor, wherein some or all data related to detecting actions of the object in the scene from the video of the scene can be outputted.

According to an embodiment of the present disclosure, a method for detecting actions of an object in a scene from a video of the scene, wherein the video can be a video sequence partitioned into chunks, and each chunk includes consecutive video frames. The method includes the following steps. Acquiring the video of the scene, wherein the video includes a sequence of images. Tracking the object in the video, and for each object and each chunk of the video, the method further comprises the following steps: determining a sequence of contour images from video frames of the video sequence to represent motion data within a bounding box located around the object. Using the bounding box to produce cropped contour images and cropped images for one or more images in each chunk. Passing the cropped contour images and the cropped images to a recurrent neural network (RNN) that outputs a relative score for each action of interest.

According to an embodiment of the present disclosure, a system for detecting actions of interest of an object in a scene from a video of the scene, wherein the video is a video sequence of the scene partitioned into chunks, and each chunk includes consecutive video frames. The system including a processor acquires the video of the scene, such that the video includes a sequence of images. Wherein the processor is configured to track the object in the video, and for each object and each chunk of the video, the method includes the following steps. Determine a sequence of contour images from video frames of the video sequence to represent motion information within a bounding box located around the object. Use the bounding box to produce cropped contour images and cropped images for one or more images in each chunk. Pass the cropped contour images and the cropped images to a recurrent neural network (RNN) that outputs a relative score for each action of interest.

According to an embodiment of the present disclosure, a non-transitory computer readable storage medium embodied thereon a program executable by a computer for performing a method that detects actions of interest of an object in a scene from a video of the scene. Wherein the video can be a video sequence of the scene partitioned into chunks, such that each chunk includes consecutive video frames. The method includes acquiring the video of the scene by a processor, wherein the video can include a sequence of images. Tracking the object in the video by the processor, and for each object and each chunk of the video, the processor is configured for: determining a sequence of contour images from video frames of the video sequence within a bounding box located around the object; using the bounding box to produce cropped contour images and cropped images for one or more images in each chunk; and passing the cropped contour images and the cropped images to a recurrent neural network (RNN) that outputs a relative score for each action of interest via an output interface in communication with the processor.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3A and FIG. 3B give an example of a contour image. FIG. 3A shows an input image from a sequence of images.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates generally to computer vision and camera surveillance applications, and more particularly to detecting instances of objects, such as people, performing certain actions of interest in videos by using a sequence of contour images computed from frames of a video sequence to represent motion information.

The present disclosure provides methods and systems that overcome the problem for video analysis tasks such as action recognition, event detection, and video retrieval that rely on input representations and intermediate representations that are very time-consuming to compute and also require a huge amount of memory to store. In particular, the present disclosure describes action detection methods and systems that are able to detect actions in a video efficiently, both in terms of minimizing time-consuming computations and reducing memory storage/requirements.

Specifically, the present disclosure is based on a recognition that the use of a sequence of contour images computed from frames of a video sequence to represent motion information, can provide for fast and memory efficient detectors for actions in videos, among other things. For example, the present disclosure addresses action detection in videos based on localizing in time (which frames of the video) and space (where in each frame) the occurrence of the particular actions. Through experimentation we realized we can detect actions in videos using a deep neural network with recurrent connections that takes as input a cropped image around a tracked object, such as a person, as well as a sequence of contour images that represent the motion within the cropped region across multiple frames. We found from previous approaches using optical flow-based representations that such approaches are costly to compute, i.e., require time-consuming computations and large amounts of memory and storage. This makes these previous action detection approaches impractical for real-world applications.

The present disclosure further includes an object/person tracker that can spatially localize where the action takes place within the video frames. We discovered through experimentation that conventional approaches that do not use a tracker, and instead only analyze motion and appearance over entire frames, use a large amount of information that is irrelevant to the action of interest. Also, such approaches do not have enough detailed information from the regions that are most important to the task.

Further, the present disclosure also uses a multi-stream recurrent neural network (RNN) that learns features that represent the important aspects of both the motion and appearance, and learns the important temporal dynamics over many video frames that distinguish different actions. For example, the methods and systems can be used for detecting actions of objects in a video, where the objects can be people, animals, machinery, vehicles, robots, industrial robots in a factory setting, etc. The present disclosure provides for a more accurate action detection for actions of objects that occur in videos that are not temporally trimmed.

Another aspect of the present disclosure includes use of a Long Short-Term Memory (LSTM) network, included as one or more layers of the RNN, which can learn patterns with longer temporal duration than can be learned using a conventional RNN. The present disclosure can provide better performance using a bi-directional LSTM, which means that the present disclosure can detect actions using information from past and future video frames.

Methods & Systems

Figure 1A:
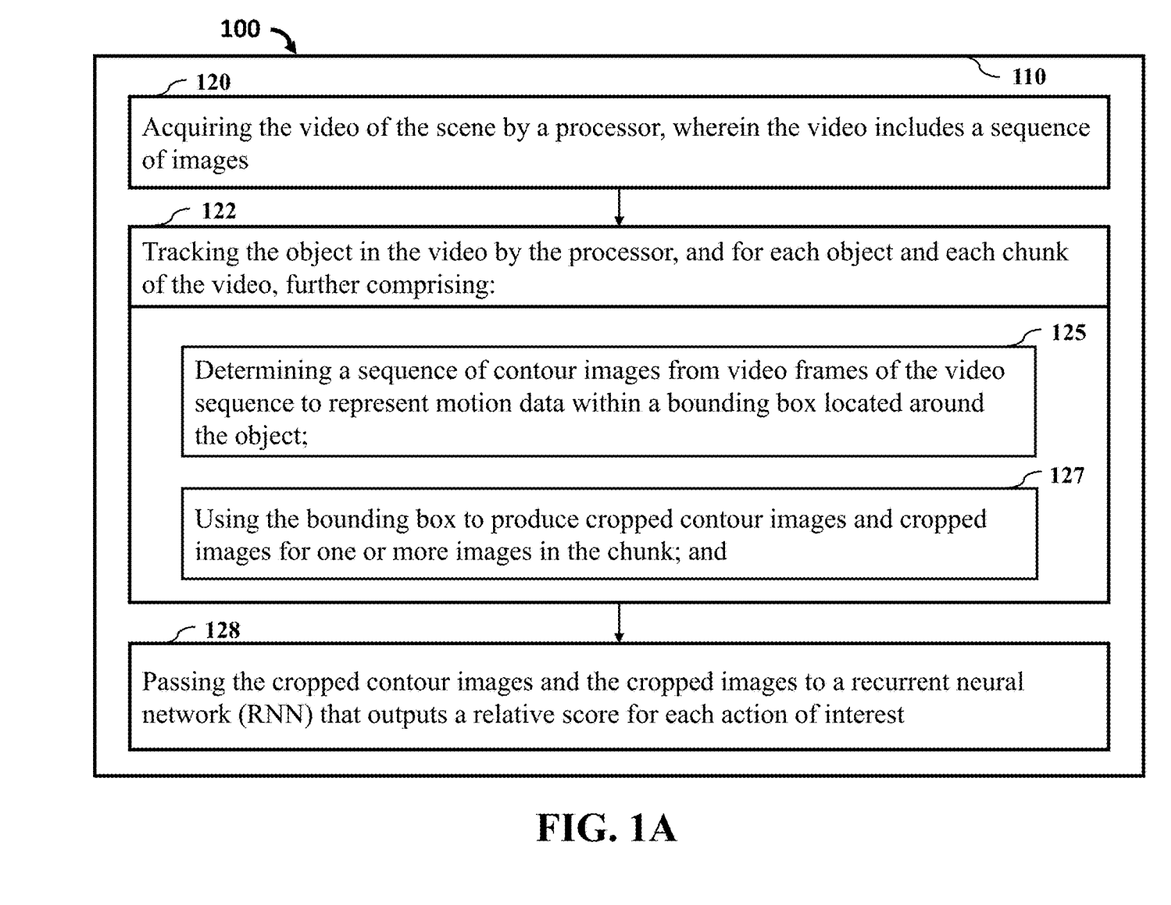
FIG. 1A shows a block diagram of methods for detecting actions of an object in a scene from a video of the scene, according to an embodiment of the present disclosure.

FIG. 1A shows a block diagram of a method 100 for detecting actions of an object in a scene from a video of the scene, according to an embodiment of the present disclosure. The video can be a video sequence partitioned into chunks, such that each chunk includes consecutive video frames. The initial step 120 includes acquiring the video of the scene by a processor 110, wherein the video includes a sequence of images.

Step 122 includes tracking the object in the video, and for each object and each chunk of the video, that further comprises: step 125 determining a sequence of contour images from video frames of the video sequence to represent motion data within a bounding box located around the object; and step 127 using the bounding box to produce cropped contour images and cropped images for one or more images in each chunk.

Finally, step 128 includes passing the cropped contour images and the cropped images to a recurrent neural network (RNN) that outputs a relative score for each action of interest.

Figure 1B:
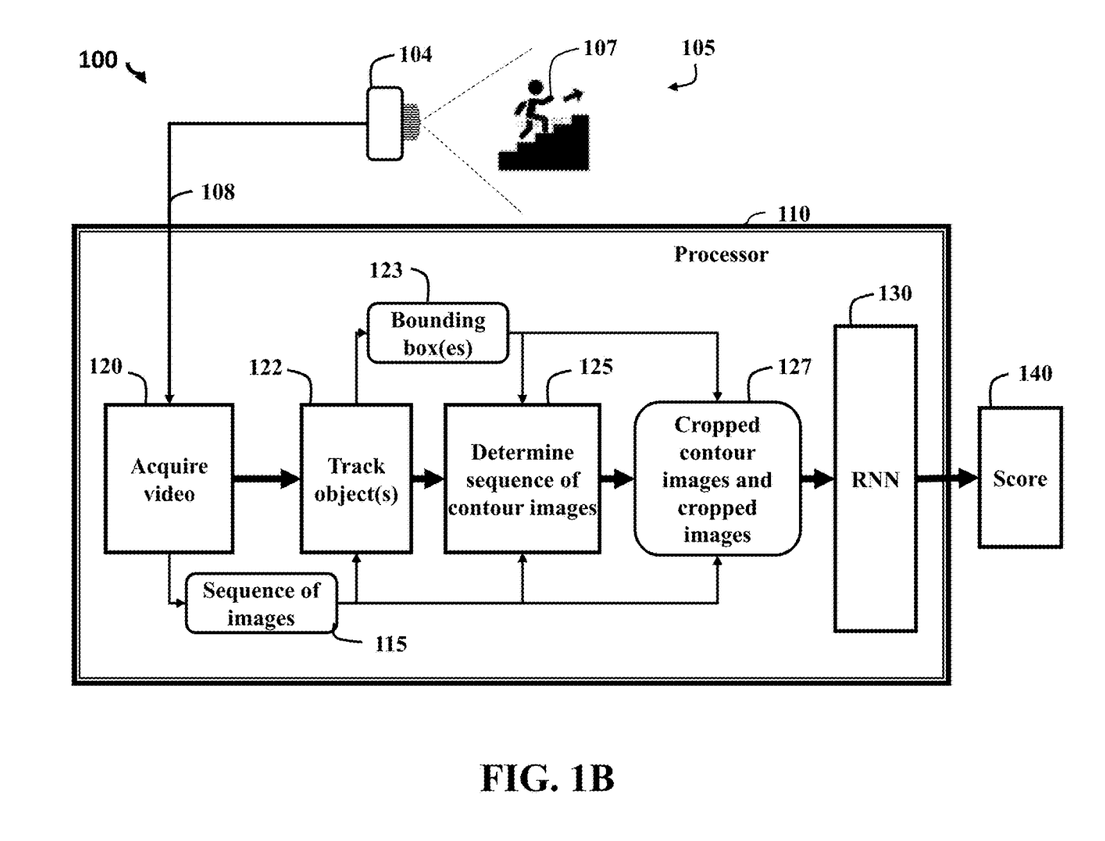
FIG. 1B a schematic diagram illustrating some components of the method of FIG. 1A for detecting actions of an object in a scene from a video of the scene, according to some embodiments of the present disclosure.

FIG. 1B a schematic diagram illustrating components of the method 100 of FIG. 1A for detecting actions of an object in a scene from a video of the scene, according to an embodiment of the present disclosure. Specifically, FIG. 1B shows a basic operation of method 100 for detecting actions of object(s) 107 in the scene 105, such as detecting people in a scene performing specific actions. Video data 108 from a video camera 104 are acquired 120 of the scene 105 as a sequence of images 115, wherein each image includes pixels. The scene can include one or more objects 107 performing actions, e.g., a person running up stairs or some other action. The video data are acquired by the processor 110. Further, one or more of the objects 107 are tracked 122, and a bounding box 123 of each tracked object 107 is estimated in each chunk of video images. For example, a chunk can be a sequence of six consecutive images, fewer than six images, or more than six images.

The images are cropped to the extent of the bounding box 123, and sequence of contour images are computed 125 and cropped to the extent of the bounding box 123. The resulting cropped contour images and cropped images 127 are passed to a recurrent neural network (RNN) 130 that has been trained to output a relative score 140 for each action of interest. The steps can be performed in the processor 110 connected to a memory (not shown).

The embodiments of our present disclosure provide methods and systems for detecting actions of objects in a video, as disclosed above. Some embodiments include a training phase and a testing phase, wherein the training phase involves learning the parameters of the RNN from training data. Some embodiments can include only a testing phase. For example, a method with only test phase could be embedded in a small device that makes use of a previously trained RNN.

Figure 2:
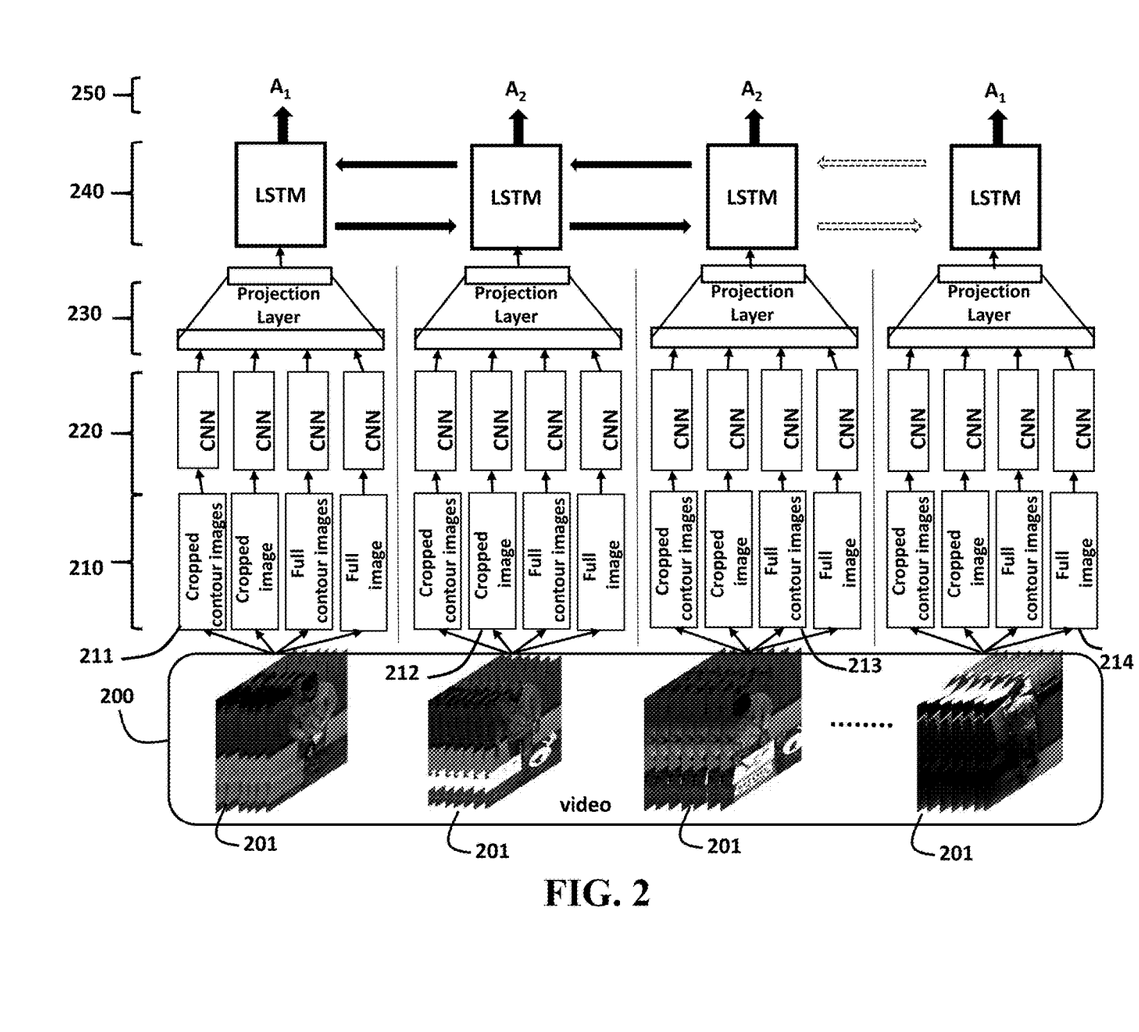
FIG. 2 is a schematic illustrating a recurrent neural network (RNN) that includes a multi-stream convolutional neural network (CNN) as its initial layers and a Long Short-Term Memory (LSTM) network as its final layer or layers, according to some embodiments of the present disclosure.

FIG. 2 is a schematic illustrating a recurrent neural network (RNN) that includes a multi-stream convolutional neural network (CNN) as its initial layers and a Long Short-Term Memory (LSTM) network as its final layer or layers, according to embodiments of the present disclosure.

For example, during the training phase, we train four independent convolutional neural networks (CNNs) 220, as shown in FIG. 2. Each CNN processes one of four streams 210: a motion stream 211 and an appearance stream 212 for video images that are cropped around the location of a tracked object, and a motion stream 213 and an appearance stream 214 for the full-frame (not spatially cropped) video images. Some embodiments have only two streams: a motion stream 211 and an appearance stream 212 for video images that are cropped around the location of a tracked object. This might be useful, for example, for cases in which the background scene is noisy, nondescript, or otherwise unrelated to the actions being performed by the object.

Still referring to FIG. 2, in some embodiments, each convolutional network (CNN) uses a VGG (Visual Geometry Group) architecture. However, other CNN architectures could also be used for each stream, such as the AlexNet architecture or a ResNet architecture.

The four networks perform the task of action classification on successive small chunks 201 of a video 200. For example, each chunk could consist of six consecutive video frames. The CNNs are followed by a projection layer 230, which projects the outputs of all of the streams' CNNs into a single space, and Long Short-Term Memory (LSTM) cells 240. The output for each chunk is a detected action class 250 from a set of N action classes $A_1, A_2, \ldots, A_N$.

Two convolutional neural networks (CNNs), one each for images and motion, are trained on chunks consisting of video frames that have been cropped to a bounding box of a tracked object. The cropped frames provide actions with a bounding box that is restricted to the neighborhood of the actions, which helps in classifying the actions. In some embodiments, this bounding box has a fixed size in pixels, which helps to align objects over multiple performances of an action.

Still referring to FIG. 2, in some preferred embodiments, two additional CNNs, one each for images and motion, are trained on chunks consisting of video frames that are not spatially cropped, i.e., each frame is a full frame of the video, so that a spatial context of the action being performed within a scene is preserved. We refer to the network as a multi-stream neural network because is has multiple (e.g., four) CNNs, each of which processes a different stream of information from the video.

After these four networks 220 have been trained, we learn a fully-connected projection layer 230 on top of the outputs of the four networks to create a joint representation for these independent streams. In some embodiments in which the CNNs use a VGG architecture, the outputs of the networks are their fc7 layer outputs, where the fc7 layer is the last fully connected layer in the VGG network. The multi-stream network is provided with the full-length video 200, arranged as a temporal sequence of chunks 201, and the corresponding temporal sequence of outputs of the projection layers are then fed into the Long Short-Term Memory (LSTM) network 240. In some embodiments, the LSTM network runs in two directions, i.e., the LSTM network is bi-directional.

The bi-directional LSTM network consists of two directional LSTM networks (one connected forwards in time, the other connected backwards in time). In some embodiments, each of the two directional LSTM networks is followed by a fully-connected layer, for clarity not shown in FIG. 2, on top of each directional LSTM network's hidden states, followed by a softmax layer, to obtain intermediate scores corresponding to each action. Finally, the scores for the two directional LSTMs are combined, e.g., averaged, to obtain scores for each specific actions.

Still referring to FIG. 2, there are multiple components in an action detection pipeline that are critical for achieving good performance. In this task, we use a model that characterizes spatial and long-term temporal information that are present in the video.

Contour images determined using bounding boxes provide a reference image that makes many actions easier to learn by removing location variation from the input representation. Some actions, however, are location dependent. For scenes acquired using a static video camera, these actions always occur at the same image location. For example, in videos of cooking, washing and rinsing are almost always done near a sink, and opening a door would most likely be performed near a refrigerator or a cupboard. For these reasons, we train two separate deep networks, on cropped and uncropped chunks of contour images and video frames.

The first two CNNs are trained on cropped images, cropped using boxes from the object tracker, to reduce background noise and to provide an object-centric reference image for contour images and image regions. The other two CNNs are trained on the entire (spatially full-frame) images to preserve global spatial context.

Figure 3A:
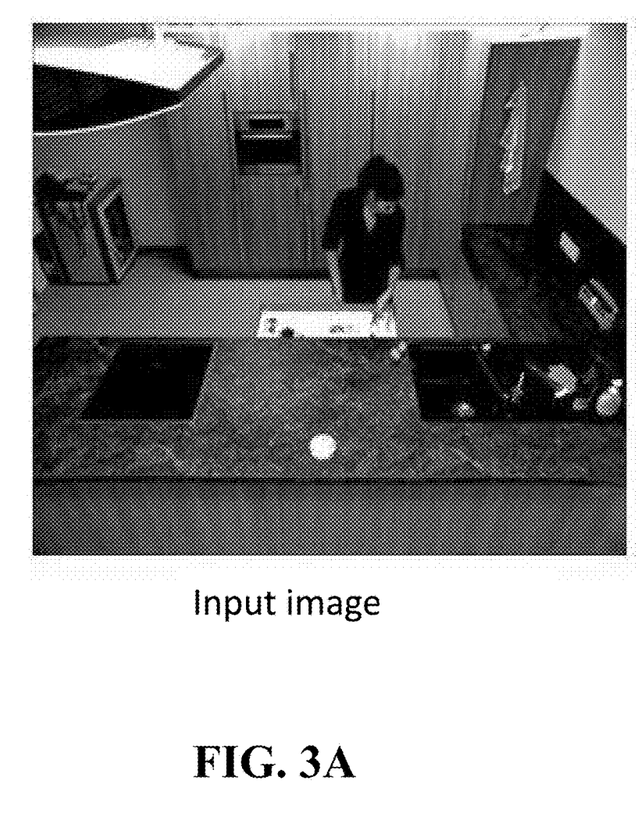
Figure 3B:
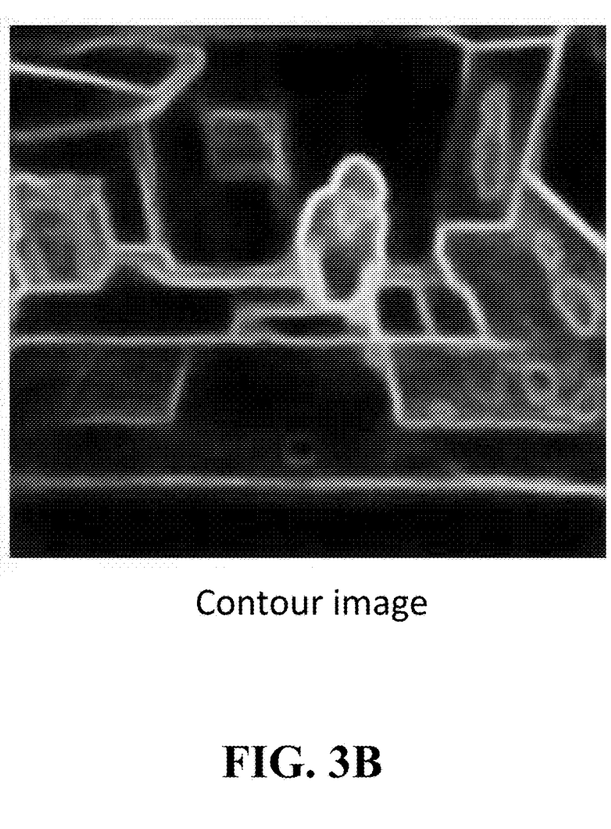
FIG. 3B shows a contour image that is determined from the input image, according to some embodiments of the present disclosure.

FIG. 3A and FIG. 3B illustrate a contour image determined from an input image. The input image represents an image from the image sequence. The contour image may be determined from the input image using an image processing algorithm, such as one that uses a deep neural network to determine object contours.

A contour image can be automatically computed from an input image, and represents edges along the boundaries of each object in the image. Further, a contour image does not represent colors and textures within the input image, but only the boundaries of objects. A sequence of contour images contains only the most relevant information, object contours, concerning the movement of objects in the corresponding image sequence.

Because the actions to be detected can have a wide range of durations, our method uses the LSTM network 140 to learn the duration and long-term temporal context of actions in a data-driven fashion. Our results demonstrate that LSTMs are effective in learning long-term temporal context for fine-grained action detection.

Tracking for Fine-Grained Action Detection

To provide a bounding box around an object for the location-independent (cropped) appearance and motion streams, any object-tracking method could be used. In a preferred embodiment, we use a state-based tracker to spatially localize actions in the video. Keeping the size of the tracked bounding box fixed, we update the position of the bounding box so that a magnitude of difference image energy inside the bounding box is maximized. If the magnitude of the difference image energy is greater than a threshold, then the location of the bounding box is updated to be the location that maximizes the magnitude of difference image energy. Otherwise, the object is either moving slowly or not at all. When the object is moving too slowly or is not moving, the bounding box from the previous chunk is used, i.e., the bounding box is not updated. The location of the bounding box is updated only after the chunk 101 (e.g., six images) is processed and motion and appearance features are determined relative to the chunk, to ensure that the bounding box is stationary over all of the images in the chunk.

Our tracking method can be effectively applied when the camera is stationary and we have a reasonable estimate about the size of the object. This is a practical assumption for many videos taken at retail stores, individual homes, or in a surveillance setting where fine-grained action detection is likely to be used. For more difficult tracking situations, a more sophisticated tracker can be used.

In preferred embodiments, the bounding box is a rectangular region containing the object, but the bounding box does not need to be rectangular. More generally, the bounding box is a region of any shape that contains or largely contains the object being tracked, and that may additionally contain a small region around the object.

Action Detection on Long Sequences Using a Bi-Directional LSTM Network

Figure 4:
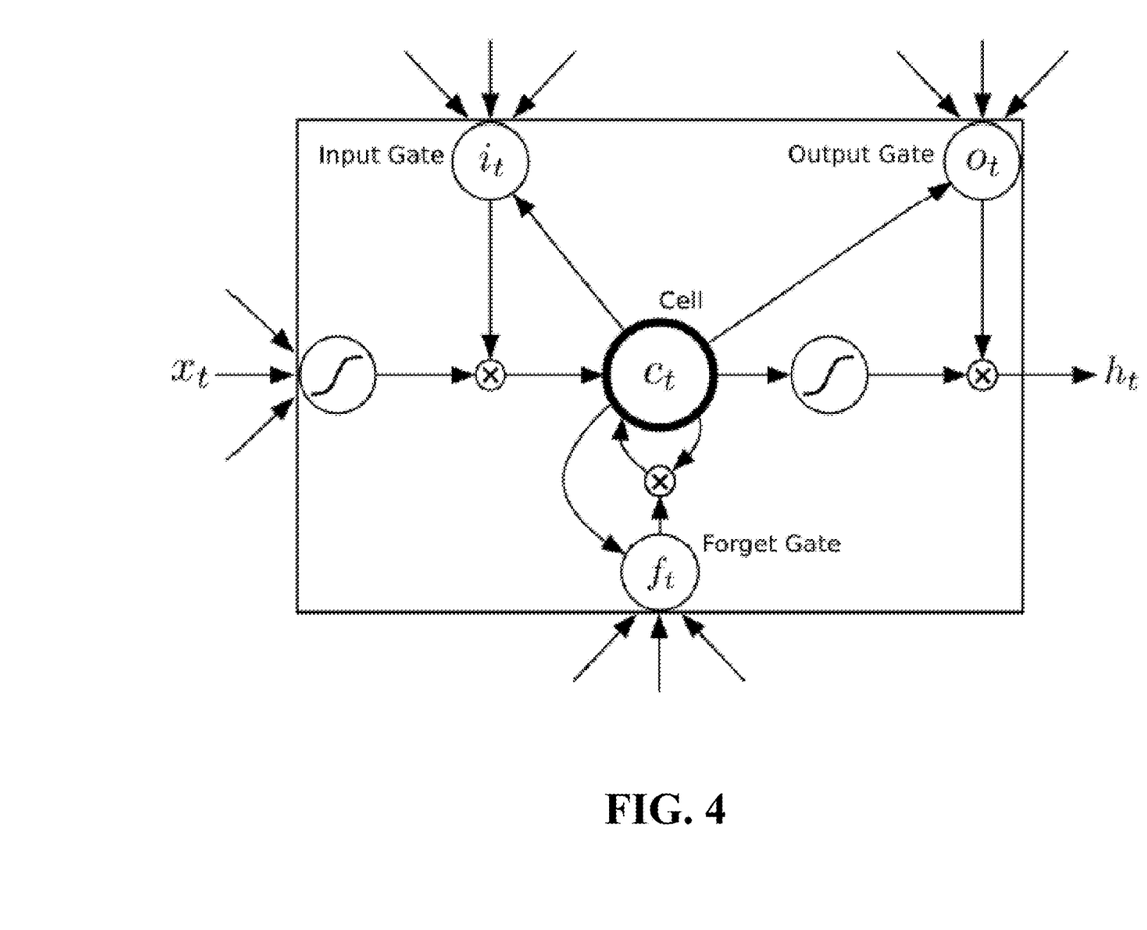
FIG. 4 is a schematic illustrating an LSTM cell, according to some embodiments of the present disclosure.

FIG. 4 is a schematic illustrating an LSTM cell, according to some embodiments of the present disclosure. We now provide a brief description of Recurrent Neural Networks (RNNs) and Long Short-Term Memory (LSTM) cells. Given an input sequence, $x=(x_1, \ldots, x_T)$, an RNN uses a hidden state representation $h=(h_1, \ldots, h_T)$ so that the RNN can map the input x to an output sequence $y=(y_1, \ldots, y_T)$.

To determine this representation, the RNN iterates through the following recurrence equations:

$$h_t = g(W_{xh}x_t + W_{hh}h_{t-1} + b_h), \quad y_t = g(W_{hy}h_t + b_z),$$

where g is an activation function, $W_{xh}$ is a weight matrix that maps the input to the hidden state, $W_{hh}$ is a transition matrix between hidden states at two adjacent time steps, $W_{hy}$ is a matrix that maps the hidden state h to the output y, and $b_h$ and $b_z$ are bias terms.

Still referring to FIG. 4, unlike hidden Markov models (HMMs), which use discrete hidden state representations, recurrent neural networks use a continuous-space representation for the hidden states. However, it is difficult to train RNNs to learn long-term sequence information because training is performed by unrolling the network using backpropagation through time. This leads to either a vanishing or exploding gradient problem.

As shown in FIG. 4, to avoid this problem, an LSTM cell has a memory cell $c_t$ and a forget gate $f_t$ that help the LSTM learn when to retain the previous state and when to forget the state. This enables the LSTM network to learn long-term temporal information. The weight update equations for the LSTM cell are as follows:

$$i_t = \sigma(W_{xi}x_t + W_{hi}h_{t-1} + b_i)$$

$$f_t = \sigma(W_{xf}x_t + W_{hf}h_{t-1} + b_f)$$

$$o_t = \sigma(W_{xo}x_t + W_{ho}h_{t-1} + b_o)$$

$$g_t = \tanh(W_{xc}x_t + W_{hc}h_{t-1} + b_c)$$

$$c_t = f_t c_{t-1} + i_t\, g_t$$

$$h_t = o_t\, \tanh(c_t)$$

where $\sigma$ is a sigmoid function, tan h is the hyperbolic tangent function, and $i_t$, $f_t$, $o_t$, and $c_t$ are the input gate, forget gate, output gate, and memory cell activation vectors, respectively.

The forget gate $f_t$ decides when (and which) information is cleared from the memory cell $c_t$. The input gate $i_t$ decides when (and which) new information is incorporated into the memory. The tan h layer $g_t$ generates a candidate set of values, which are added to the memory cell when permitted by the input gate.

Still referring to FIG. 4, based on the output of the forget gate $f_t$, input gate $i_t$, and the new candidate values $g_t$, the memory cell $c_t$ is updated. The output gate $o_t$ controls which information in the memory cell is used as a representation for the hidden state. The hidden state is represented as a product between a function of the memory cell state and the output gate.

LSTM architectures for RNNs have been successfully used for sentence generation from images, video-to-text video description, and in speech recognition. For the task of action recognition, however, the performance of LSTM networks is still close to that of a classifier based on Fisher vectors generated over improved dense trajectories. It may be due to their lackluster performance on action recognition from video that RNNs using LSTMs have not been used for action detection from video, which is a focus of the present disclosure.

In commonly used action recognition datatsets, videos are temporally trimmed to start and end at or near the start and end times of each action. The temporally trimmed videos are generally short in length, e.g., from 2-20 seconds. Hence, in the action recognition task, there is not enough long-term context to be learned in a data-driven manner. This long-term context can include properties such as the expected duration of an action, which action follows or precedes another action, and other long-term motion patterns that extend temporally beyond action boundaries.

Still referring to FIG. 4, in an action recognition task, the LSTM network has little access to the longer-term temporal context. In fine-grained action detection, however, video durations are typically on the order of minutes or hours. Thus, we had the key insight that LSTM networks would be more suited to action detection (to which we applied them) than to action recognition (to which they were previously applied), because LSTMs model long-term temporal dynamics in a sequence.

Bi-directional LSTM networks integrate information from both future chunks and past chunks to make a prediction for each chunk in the video sequence. Therefore, we predicted that bi-directional LSTM networks would be better than a uni-directional LSTM at predicting the temporal boundaries (i.e., the beginning and end) of an action.

As described herein, the forward and backward LSTM networks each produce a softmax score for every action class, and we average the softmax scores of the two LSTM networks to obtain the score (probability) for each action.

While training the LSTM networks on long sequences, back-propagation through time can only be done up to a fixed number of steps, using a short sequence of chunks. To preserve long-term context, we retain the hidden state of the last element in the previous sequence of chunks when training on the subsequent sequence of chunks.

Figure 5:
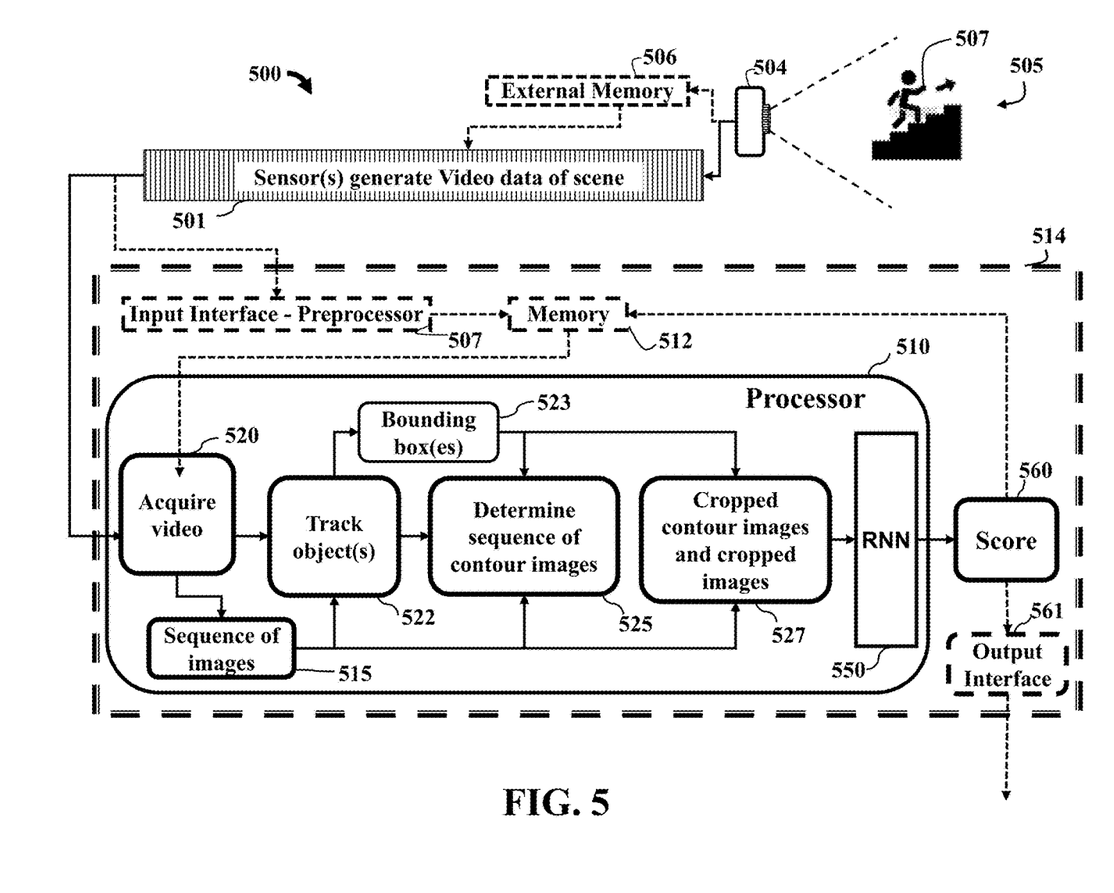
FIG. 5 is schematic of at least one method and system for detecting actions of objects, according to embodiments of the present disclosure.

FIG. 5 is schematic of at least one method and system for detecting actions of objects, according to embodiments of the present disclosure. For example, as provided above, a training phase of the method involves training a recurrent neural network (RNN). In the testing phase, i.e., action detection, an already-trained RNN is used to detect actions of objects.

FIG. 5 shows the basic operation of the method and system 500 for detecting actions of objects, such as detecting people in a scene performing specific actions. For example, method 500 can include at least one sensor 504 that generates the input video data of a scene 505. The sensor 504 can be a video camera or some other device that generates input video data. It is contemplated sensor 504 could gather other data such as time, temperature, and other data related to the scene 505.

A computer readable memory 512 of a computer 514 can store and/or provide the input video data 501 generated by the sensor 504. The sensor(s) 504 collect the input video data 501 of the scene 505 which can be optionally stored in an external memory 506 or can be sent directly to an input interface/preprocessor 507, and then sent to processor 510.

Further, video 501 is acquired 520 of the scene 505 as a sequence of images 515, wherein each image includes pixels. The scene 505 can include one or more objects 507 performing actions, e.g., a person running up stairs. Optionally, there may be an external memory 506 that is connected to an input interface/preprocessor 507, connected to memory 512, which is connected to acquiring the video 520, as noted above.

Further, one or more of the objects are tracked 522, and a bounding box 523 of the tracked object is estimated in each chunk of video images. For example, a chunk can be a sequence of six images, by non-limiting example.

The images are cropped to the extent of the bounding box, and contour images are computed 525 within the bounding box. The resulting cropped contour images and cropped images 527 are passed to a recurrent neural network (RNN) 550 that has been trained to output a relative score 560 for each action of interest.

Upon the output of the relative score 560 for each action of interest, the output of the relative score 560 can either be stored in memory 512 or outputted via the output interface 561. During processing, the processor 514 may be communicating with the memory 512 for storing or retrieving stored instructions or other data related to processing.

Figure 6:
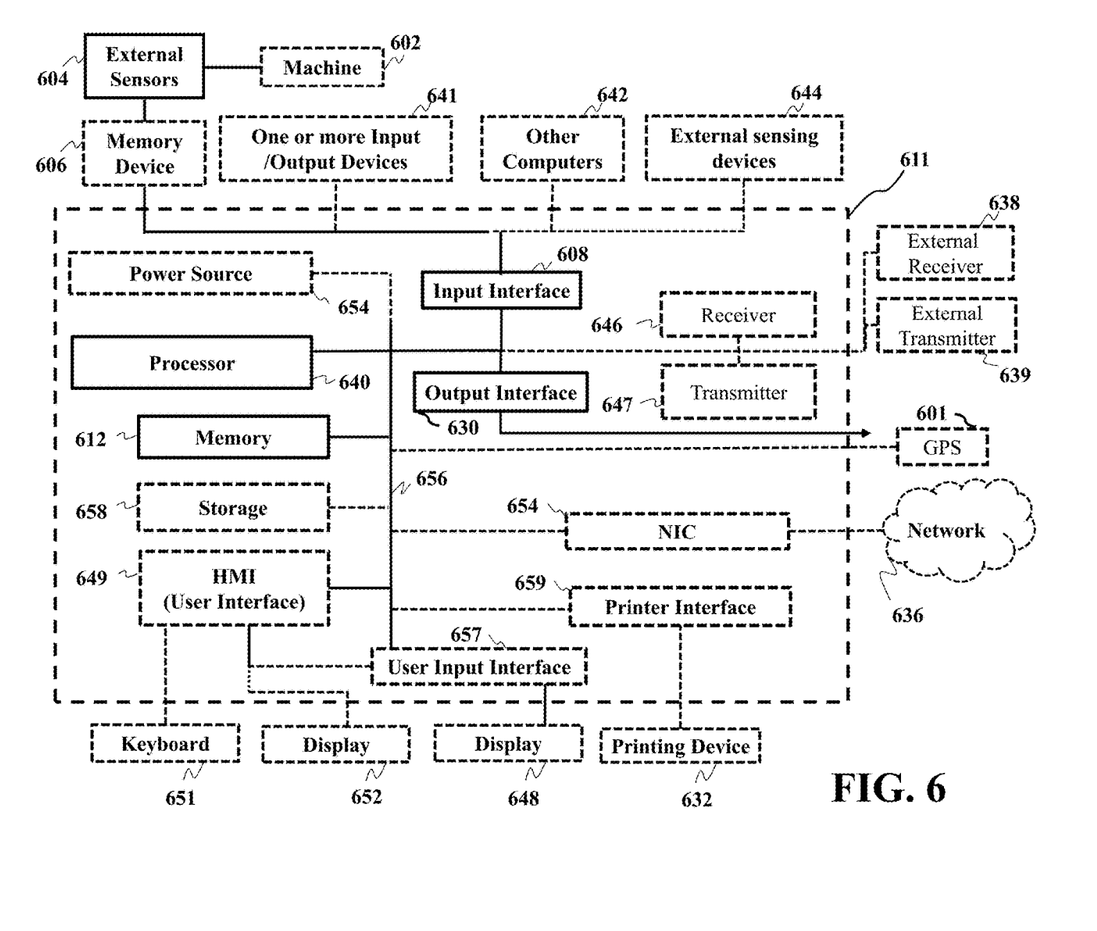
FIG. 6 is a block diagram of illustrating the method of FIG. 1A, that can be implemented using an alternate computer or processor configuration, according to embodiments of the present disclosure.

FIG. 6 is a block diagram illustrating the method of FIG. 1A, that can be implemented using an alternate computer or processor configuration, according to embodiments of the present disclosure. The computer/controller 611 includes a processor 640, computer readable memory 612, storage 658 and user interface 649 with display 652 and keyboard 651, which are connected through bus 656. For example, the user interface 649 in communication with the processor 640 and the computer readable memory 612, acquires and stores the data in the computer readable memory 612 upon receiving an input from a surface, keyboard surface, of the user interface 657 by a user.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

Still referring to FIG. 6, a storage device 658 can be adapted to store supplementary data and/or software modules used by the processor. For example, the storage device 658 can store historical data and other related data as mentioned above regarding the present disclosure. Additionally, or alternatively, the storage device 658 can store historical data similar to data as mentioned above regarding the present disclosure. The storage device 658 can include a hard drive, an optical drive, a thumb-drive, an array of drives, or any combinations thereof.

The system can be linked through the bus 656 optionally to a display interface (not shown) adapted to connect the system to a display device (not shown), wherein the display device can include a computer monitor, camera, television, projector, or mobile device, among others.

The controller 611 can include a power source 654, depending upon the application the power source 654 may be optionally located outside of the controller 611. Linked through bus 656 can be a user input interface 657 adapted to connect to a display device 648, wherein the display device 648 can include a computer monitor, camera, television, projector, or mobile device, among others. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein data or other data, among other things, can be rendered on a third party display device, third party imaging device, and/or third party printing device outside of the controller 611.

Still referring to FIG. 6, the data or other data, among other things, can be transmitted over a communication channel of the network 636, and/or stored within the storage system 658 for storage and/or further processing. Further, the data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. Further, a GPS 601 may be connected via bus 656 to the controller 611. The controller 611 may be connected via an input interface 608 to external sensing devices 644 and external input/output devices 641. The controller 611 may be connected to other external computers 642. An output interface 609 may be used to output the processed data from the processor 640.

Aspects of the present disclosure can further include the bi-directional Long Short-Term Memory LSTM network managing stored data over time based on conditions, wherein the conditions include an input gate, a forget gate and an output gate, so as to manage stored data based on changes over time, wherein the stored data over time is similar to data related to the actions of interest, such that the stored data includes historical properties of an expected duration of an action of interest, historical types of actions of interest that follow or precede an action of interest, and historical long-term motion patterns that extend beyond a bounding box boundary of an action of interest.

The above-described embodiments of the present disclosure can be implemented in any of numerous ways. For example, the embodiments may be implemented using hardware, software, or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A method for detecting actions of an object in a scene from a video of the scene, such that the video is a video sequence of the scene partitioned into chunks, and each chunk includes consecutive video frames, comprising:
   acquiring the video of the scene by a processor, wherein the video includes a sequence of images;
   tracking the object in the video by the processor, and for each object and each chunk of the video, further comprising:
   determining a sequence of contour images from video frames of the video sequence to represent motion data within a bounding box located around the object;
   using the bounding box to produce cropped contour images and cropped images for one or more images in each chunk; and
   passing the cropped contour images and the cropped images to a recurrent neural network (RNN) that outputs a relative score for each action of interest.

2. The method of claim 1, wherein the RNN includes convolutional neural network layers and one or more recurrent neural network layers.

3. The method of claim 2, wherein the convolutional neural network layers operate on multiple streams, including the cropped sequence of contour images and the cropped images.

4. The method of claim 2, wherein the convolutional neural network layers operate on multiple streams, including the cropped sequence of contour images and the cropped images, as well as contour images and images that have an entire spatial extent of the video frame.

5. The method of claim 2, wherein the recurrent neural network layers include Long Short-Term Memory (LSTM) cells.

6. The method of claim 5, wherein the recurrent neural network layers include bi-directional Long Short-Term Memory (LSTM) cells.

7. The method of claim 1, wherein the object is one of a person, a robot, or an industrial robot.

8. The method of claim 7, further comprising a person detector and a person tracker.

9. The method of claim 8, wherein the person tracker identifies at least one bounding box around each person in the video.

10. The method of claim 9, wherein the video frames of the video sequence representing motion data of the object are within multiple bounding boxes located around the object over time.

11. The method of claim 1, wherein the bounding box is a region having a shape containing at least a portion or all portions of the object being tracked.

12. The method of claim 1, wherein the video is initially acquired in a form other than a sequence of images and is converted to a sequence of images.

13. The method of claim 1, wherein the method is used for fine-grained action detection in the video.

14. The method of claim 1, wherein the method includes training the RNN prior to the detecting or that the RNN has been previously trained prior to acquiring the video of the scene.

15. The method of claim 1, wherein the detecting comprises one of a temporal action detection or a spatio-temporal action detection.

16. A system for detecting actions of interest of an object in a scene from a video of the scene, such that the video is a video sequence of the scene partitioned into chunks, and each chunk includes consecutive video frames, comprising:
   a processor acquires the video of the scene, such that the video includes a sequence of images, wherein the processor is configured to:
   track the object in the video, and for each object and each chunk of the video;
   determine a sequence of contour images from video frames of the video sequence to represent motion information within a bounding box located around the object;
   use the bounding box to produce cropped contour images and cropped images for one or more images in each chunk; and
   pass the cropped contour images and the cropped images to a recurrent neural network (RNN) that outputs a relative score for each action of interest.

17. The system of claim 16, wherein the RNN includes convolutional neural network layers and one or more recurrent neural network layers, such that the convolutional neural network layers operate on multiple streams, including the cropped sequence of contour images and the cropped images.

18. The system of claim 16, wherein the recurrent neural network layers include Long Short-Term Memory (LSTM) cells.

19. A non-transitory computer readable storage medium embodied thereon a program executable by a computer for performing a method, the method detecting actions of interest of an object in a scene from a video of the scene, such that the video is a video sequence of the scene partitioned into chunks, and each chunk includes consecutive video frames, comprising steps:
   acquiring the video of the scene by a processor, wherein the video includes a sequence of images;

tracking the object in the video by the processor, wherein for each object and each chunk of the video, the processor is configured for:

determining a sequence of contour images from video frames of the video sequence within a bounding box located around the object;

using the bounding box to produce cropped contour images and cropped images for one or more images in each chunk; and passing the cropped contour images and the cropped images to a recurrent neural network (RNN) that outputs a relative score for each action of interest via an output interface in communication with the processor.

20. The method of claim 19, wherein the RNN includes convolutional neural network layers and one or more recurrent neural network layers, such that the convolutional neural network layers operate on multiple streams, including the cropped sequence of contour images and the cropped images.

* * * * *